(12) United States Patent
Nanda et al.

(10) Patent No.: US 8,713,050 B2
(45) Date of Patent: Apr. 29, 2014

(54) TESTING SQL QUERY WRITING SKILLS

(75) Inventors: Mohit Nanda, Maharashtra (IN); Amol Bhaskar Khanapurkar, Maharashtra (IN); Dattatraya Tendulkar, Maharashtra (IN); Jayanti Venkata Sai Narayana Murty, Maharashtra (IN)

(73) Assignee: Tata Consultancy Services

( * ) Notice: Subject to any disclaimer, the term of this patent is extended or adjusted under 35 U.S.C. 154(b) by 163 days.

(21) Appl. No.: 13/328,943

(22) Filed: Dec. 16, 2011

(65) Prior Publication Data

US 2013/0086126 A1   Apr. 4, 2013

(30) Foreign Application Priority Data

Sep. 30, 2011   (IN) .......................... 2807/MUM/2011

(51) Int. Cl.
*G06F 17/30* (2006.01)
(52) U.S. Cl.
USPC .......................................... 707/779; 707/803
(58) Field of Classification Search
None
See application file for complete search history.

(56) References Cited

U.S. PATENT DOCUMENTS

| 7,246,111 | B1* | 7/2007 | Chaware et al. | 707/718 |
| 7,822,622 | B2* | 10/2010 | Kaindl et al. | 705/2 |
| 2003/0016237 | A1* | 1/2003 | Hickey | 345/700 |
| 2005/0108319 | A1* | 5/2005 | Kohno et al. | 709/201 |
| 2009/0259646 | A1* | 10/2009 | Fujita et al. | 707/5 |
| 2011/0314060 | A1* | 12/2011 | Sinha et al. | 707/779 |
| 2012/0054342 | A1* | 3/2012 | Buco et al. | 709/224 |

\* cited by examiner

*Primary Examiner* — Robert Beausoliel, Jr.
*Assistant Examiner* — Noosha Arjomandi
(74) *Attorney, Agent, or Firm* — Lee & Hayes, PLLC

(57) ABSTRACT

A system and a method described herein relate to testing SQL query writing skills of at least one participant. The system includes an authentication module that authenticates at least one participant for writing an SQL query. The system also includes an execution module that provide access to the at least one participant to an emulated database through a shared pool of configurable computing resources and execute the SQL query of the at least one participant against the emulated database. Further, a database scaling module is present in the system, to scale the emulated database based on inputs received from the at least one participant to tune performance of the SQL query, and an evaluation module is present in the system, to evaluate performance efficiency of the SQL query against the emulated database.

13 Claims, 3 Drawing Sheets

TESTING SQL QUERY WRITING SKILLS

TECHNICAL FIELD

The present subject matter relates, in general, to systems and methods for testing SQL query writing skills and, particularly but not exclusively, for testing SQL query writing skills of participants in competitions.

BACKGROUND

A variety of programming competitions are conducted on popular basis to identify the best talent in the field of computer programming. Participants in such competitions are usually asked to write programming codes that perform a defined task. The programming code of each participant is checked for correctness, performance and efficiency, based on which the best programmer is decided and suitably rewarded.

In some programming competitions, participants are provided with a problem statement and are asked to write a program code that solves the problem in an efficient way. An example of such programming competition is an SQL (Structured Query Language) query writing competition wherein the participants are asked to write an SQL query to extract particular data information from a database provided to them. The participants test for the functional correctness and the performance of their SQL queries against the provided database. Before submitting the SQL queries, the participants are allowed to refine or tune their SQL queries within the time period given to the competitors, such that the SQL queries submitted by the participants are functionally correct and perform better against the provided database. Later, the submitted SQL queries are evaluated by reviewers, who may be part of competition organizing committee. The reviewers evaluate the submitted SQL queries and adjudicate the best performing SQL query as the winning query.

SUMMARY

This summary is provided to introduce concepts related to testing SQL (Structured Query Language) query writing skills of at least one participant and these concepts are further described below in the detailed description. This summary is not intended to identify essential features of the claimed subject matter nor is it intended for use in determining or limiting the scope of the claimed subject matter.

System(s) and method(s) for testing SQL query writing skills are described herein. In one implementation, the system includes an authentication module that authenticates at least one participant for writing an SQL query. The system also includes an execution module that provide access to the at least one participant to an emulated database through a shared pool of configurable computing resources and execute the SQL query of the at least one participant against the emulated database. Further, a database scaling module is present in the system, to scale the emulated database based on inputs received from the at least one participant to tune performance of the SQL query, and an evaluation module is present in the system, to evaluate performance efficiency of the SQL query against the emulated database.

BRIEF DESCRIPTION OF THE DRAWINGS

The detailed description is provided with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
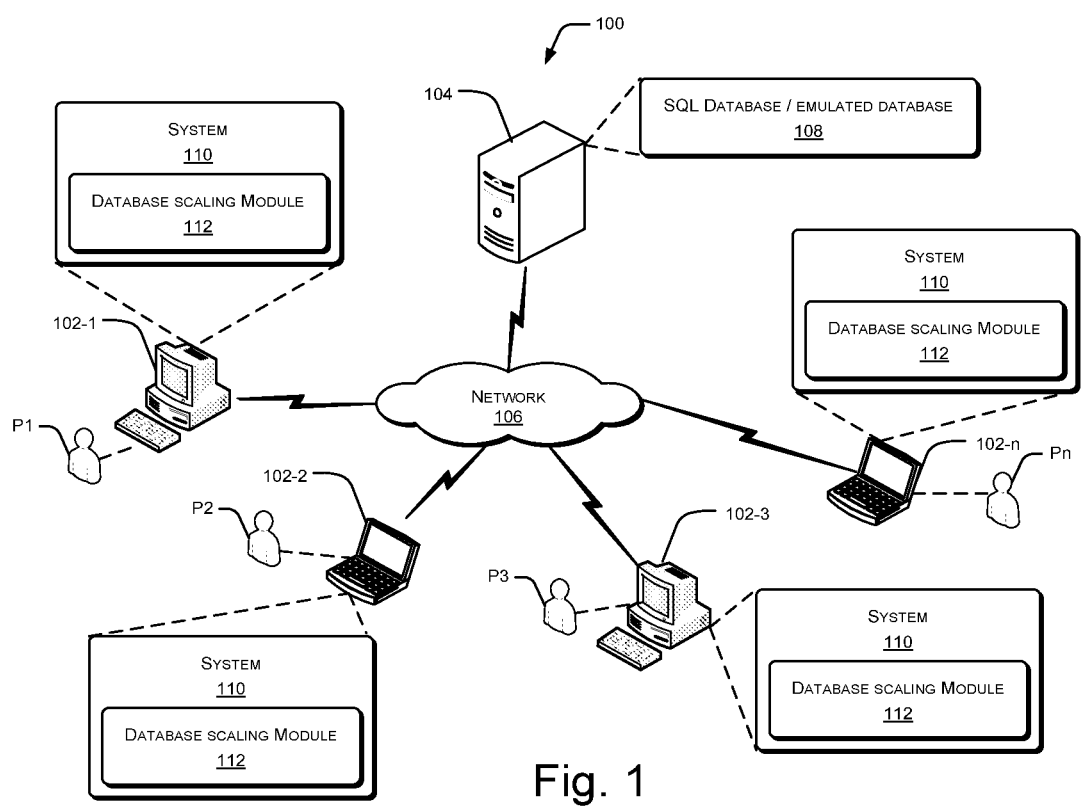
FIG. 1 illustrates a networking environment for testing SQL query writing skills in a competition, according to an implementation of the present subject matter.

The present subject matter relates to systems and methods for testing SQL (Structured Query Language) query writing skills of at least one participant in a competition. An SQL query, may include a set of steps that are written to query a database, fetch certain data information or certain records from the database, and perform certain operations on the fetched data to draw required information.

Conventionally, in an SQL query writing competition, participants of the competition are provided with a problem statement based on which they are required to write SQL queries to fetch certain specified data or records from a database. The database typically includes one or more tables, each having a plurality of rows. Each row has a certain kind of data in the form of a record. The participants are given access to the database on which they execute their SQL queries to fetch the records as per the requirements of the problem statement. The participants may be provided with an individual hardware having a database or may share a same database through a network. The SQL queries written by the participants are submitted to the competition organizing committee, and post-submission each submission is evaluated by the committee. The participant who writes a functionally correct SQL query, and whose SQL query has best performance efficiency, is adjudicated as the winner by the committee.

The performance efficiency of an SQL query is tested on the basis of its execution time. Execution time may be understood as time taken by an SQL query to query a database and fetch the desired records from the database. The performance efficiency of an SQL query may also be tested on the basis of cost based parameters, such as CPU cost and I/O cost. CPU cost may be understood as number of machine cycles that are required for the execution of SQL query. I/O cost may be understood as number of physical block reads that are required for the execution of SQL query. It is understood that the SQL query with a lower execution time, a lower CPU cost, and a lower I/O cost, has higher performance efficiency.

Conventionally, in some competitions, the participants may check functional correctness and performance efficiency of their SQL queries during the competition. Based on functional correctness and performance efficiency, the participants may modify or tune their SQL queries before the submissions. The query tuning may be done to fetch the records as per the requirements or may be done for improving the performance efficiency, for example, reducing the execution time of the SQL query. Conventionally, in some competitions, the participants are allowed to check only the functional correctness of their SQL queries before the submissions.

A database is a collection of records. The database has a size or a volume associated with it, which relates to number of records in the database. A low volume database may be understood as a database having a few thousands of records. The low volume database may have, for example, 10 thousand records. A high volume database may be understood as a database having a few millions of records. The high volume database may have, for example, 10 million records.

Conventionally, in SQL query writing competitions, a low volume database, say having a few thousand records, is provided to the participants for writing and testing their SQL queries. The size of database is limited in order to minimize or reduce the hardware requirements and costs for the competition. The participants typically test the functional correctness and the performance efficiency of their SQL queries against the low volume database before submitting their entries to the organizers. The organizers may then execute the SQL query of each participant against a high volume database and test the performance efficiency to identify the best performing SQL query. Typically, the query which gets executed in the shortest possible time is judged as the best query, which decides the winner of the competition.

The performance efficiency and the functional correctness of an SQL query are sensitive to the volume of database against which the query is tested. The SQL query which may give correct results when executed on a smaller database, may not give correct results against a larger database. Conventionally, during the competition, the participants write and test their SQL queries against a low volume database. These queries may be such that they may exhibit low performance efficiency when tested against a high volume database. Query tuning and performance optimization are usually required for a query to perform efficiently against a high volume database. A query writer while writing and testing his query against a low volume database may not be able to predict the performance efficiency of his query against a high volume database. This can be done if a high volume database is made available to the query writer, which is typically not the case during a competition. In conventional competitions, since the participants are not given access to a high volume database during writing and testing of their SQL queries, the query tuning and performance optimization skills of the participants do not get tested.

Furthermore, in competitions, same physical database resource may be shared across the participants for testing the SQL queries. This may affect activities of each participant. For example, the sharing of same physical database may slow down the execution of the queries. With this, the participants may lose valuable competition time or may take more time for writing the queries; therefore, they may not get sufficient time to tune their SQL queries to make a better submission.

Systems and methods for testing SQL query writing skills of at least one participant in a competition are described herein. The system and the method described herein provided an access to a database in an emulated form to participants of the competition. The participants test functional correctness and performance efficiency of their SQL queries against the emulated database during the competition. The emulated database may be understood as a database that emulates or mimics a physical database. By providing the emulated database, the hardware requirements get substantially reduced, which is typically an issue for a competition purpose. For the sake of simplicity, the SQL query hereinafter may be referred to as 'query'. The participants may include registered individuals and/or non-registered individuals, taking part in the competition.

The system and the method described herein allow the participants to adjust or scale the volume of the database during the competition. With this, the participants can check the performance efficiency of their queries against databases of different volumes (low and/or high) during the writing stage. In an implementation, the participants may scale-up the volume of the database to a high volume, and subsequently tune and optimize performance of their queries against the high volume database during the writing stage. This enables the competition to test the performance and query tuning skills of the participants, and identify a true SQL programming talent.

In an implementation, the participant may scale the database by a specified scaling percentage. The database includes one or more tables, each having multiples rows of records. Scaling the database by a scaling percentage may apply the scaling percentage to all the tables within the database and thereby increase records in each table proportionately.

In an implementation, the participant may scale the database by specifying number of rows in one or more tables. Tables within a database are broadly classified as master tables, transaction tables and reporting tables. In scaling by specific scaling percentage, the data may not equally scale in all such tables. For example, data in the transaction and the reporting tables scale up at a higher speed that in the master tables. With this, the database may not scale accurately according to the specified percentage. Thus, the participants may selectively scale certain tables by specifying the number of rows and may selectively scale certain tables by specifying the scaling percentage. This enables accurate scaling of the database.

In an implementation, the participants access the emulated database through a communication network. In this, each participant, using a computing system, communicates with a server having the emulated database.

In another implementation, the emulated database is provided through a cloud or cloud computing, which is an efficient and a cost effective way to share a database with a large number of participants. The cloud may be understood to be a shared pool of configurable computing resources. The cloud provides access to computing resources including applications and tools which can be scaled and/or virtualized. The users can access the application and tools through web browser as if they were locally stored in user's computing devices, while the software and data are stored at remote location. With the cloud based implementation, the SQL query writing competition can be conducted in a cost effective way and with lower workload on various computing systems and resources communicating over the cloud. In an implementation, the cloud can be a public cloud, a private cloud, a community cloud, or any combination thereof.

In yet another implementation, the participants are provided with a user interface that may be used by the participants to scale the database before executing their queries. The user interface may be understood as a graphical user interface (GUI) configured for the purpose of an SQL query writing competition.

By providing the emulated database and allowing the participants to scale the volume of database, the participants can access a high volume database during the competition in an efficient way without increasing the hardware and other system related requirements, which were issues in conventional SQL competitions.

The systems and methods, related to testing SQL query writing skills of at least one participant in a competition, as described herein, can be implemented on a variety of computing systems, such as a desktop computer, a notebook or a portable computer, a mainframe computer, a mobile communication device, a personal digital assistant, and a tablet.

While aspects of described systems and methods for testing SQL query writing skills in a competition can be implemented in any number of different computing systems, environments, and/or configurations, the implementations are described in the context of the following system(s).

FIG. 1 illustrates a networking environment 100, according to an implementation of the present subject matter, for testing SQL query writing skills of participants in a competition. The networking environment 100 may be understood as a public or a private networking environment. The competition may host a plurality of participants P1, P2, P3, . . . , Pn, hereinafter collectively referred to as participants P, for the purpose of identifying desirable SQL programming talent. The participants P may be understood as registered or non-registered individuals intending to take part in the competition. The network environment 100 of the present subject matter is scalable to host a substantially large number of participants P and a substantially large infrastructure. The network environment 100 is also scalable to enable the testing of SQL query writing skills of a large number of participants P against a substantially large number of SQL based problem statements.

For the purpose of competing in the competition, the participants P access user devices 102-1, 102-2, 102-3, . . . , 102-n, hereinafter collectively referred to as user devices 102. The user device 102 may include a computing device, such as a desktop PC, a notebook, a portable computer, a tablet, and the like.

During the competition, the participants P access a competition server 104 hosting various applications required during the competition. The competition server 104 may be implemented as any of a variety of computing devices, including, for example, a server, a workstation, and a mainframe computer. The competition server 104 may be one, or combination of one or more, storage server or network server. For the sake of simplicity, the competition server 104 hereinafter may be referred to as 'server 104'.

The user devices 102 are communicatively coupled to the server 104 over a network 106 through one or more communication links. The communication links between the user devices 102 and the server 104 are enabled through a desired form of communication, for example, via dial-up modem connections, cable links, and digital subscriber lines (DSL), wireless or satellite links, or any other suitable form of communication. The network 106 may be understood as a network, including personal computers, laptops, various servers and other computing devices.

Further, the network 106 may be a wireless network, a wired network, or a combination thereof. The network 106 can also be an individual network or a collection of many such individual networks, interconnected with each other and functioning as a single large network, e.g., the Internet or an intranet. The network 106 can be implemented as one of the different types of networks, such as intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), etc., to communicate with each other. Further, the network 106 may include network devices, such as network switches, hubs, routers, and Host Bus Adapters (HBAs), for providing a link between the user devices 102 and the server 104. The network devices within the network 106 may interact with the user devices 102 and the server 104 through the communication links.

In an implementation, the server 104 is implemented with an SQL database 108 in an emulated form. For the sake of simplicity, the SQL database 108 hereinafter may be referred to as the 'emulated database 108'. The participants P can access the emulated database 108 through their respective user devices 102 during the competition to check the functional correctness and performance efficiency of their queries.

In an implementation, the user devices 102 are implemented with a system 110 for testing SQL query writing skills in a competition. The system 110 may be a software-based or a hardware-based implementation or a combination thereof. In an implementation, the system 110 for testing SQL query writing skills may be implemented on the server 104, or can be implemented external to the server 104, communicatively coupled to the server 104, or both, and the participants P access the system 110 for the purpose of competing in the competition.

In an implementation, the system 110 includes a database scaling module 112. The database scaling module 112 allows the participants P to scale or adjust the size or the volume of the emulated database 108 during the competition. As explained earlier, the participants P may scale the emulated database 108 by a specific scaling percentage, by increasing the number of rows to a specific number for rows in selected tables of the database, or by both. The participants P can check the performance efficiency of their queries against databases of different volumes during the competition, and based on the performance efficiency the participants P can tune the queries to better the performance efficiency during the competition. This scaling of emulated database 108 by the participants P is further elaborated later in the description.

Figure 2:
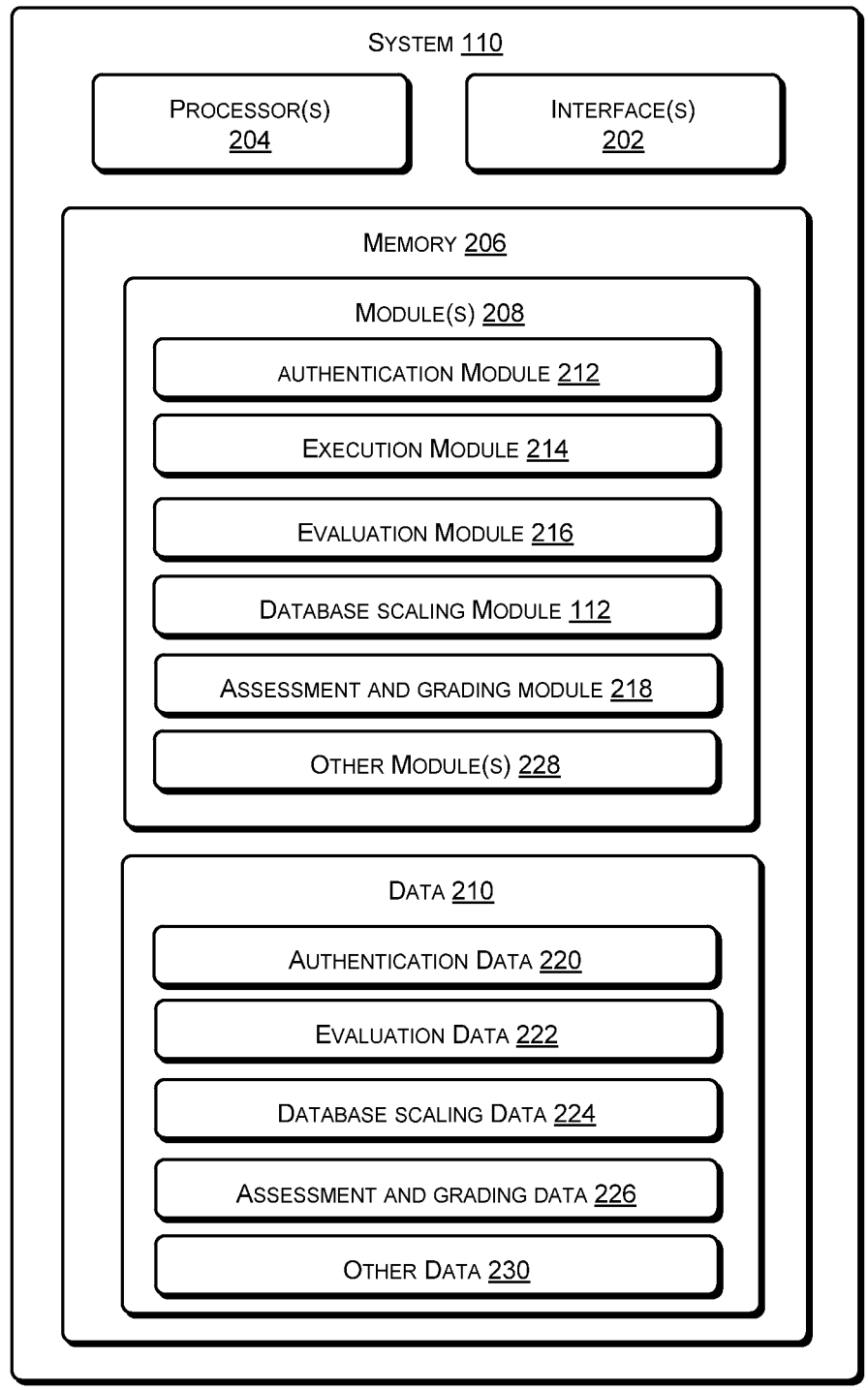
FIG. 2 illustrates a system for testing SQL query writing skills in a competition, according to an implementation of the present subject matter.

FIG. 2 illustrates the system 110 for testing SQL query writing skills in a competition, according to an implementation of the present subject matter. The system 110 includes interface(s) 202, one or more processor(s) 204 and a memory 206 coupled to the processor(s) 204. The interface(s) 202 may include a variety of software and hardware interfaces, for example, interfaces for peripheral device(s), such as a keyboard, a mouse, an external memory, and a printer. The interface(s) 202 may enable the system 110 to communicate with other devices, such as external computing devices and external databases. The interfaces 202 may include one or more ports to allow communication between user device 102 and the server 104.

The processor 204 can be a single processor unit or a number of units, all of which could include multiple computing units. The processor 204 may be implemented as one or more microprocessors, microcomputers, microcontrollers, digital signal processors, central processing units, state machines, logic circuitries, and/or any devices that manipulate signals based on operational instructions. Among other capabilities, the processor 204 is configured to fetch and execute computer-readable instructions and data stored in the memory 206.

The memory 206 may include any computer-readable medium known in the art including, for example, volatile memory such as static random access memory (SRAM) and dynamic random access memory (DRAM), and/or non-volatile memory, such as read only memory (ROM), erasable programmable ROM, flash memories, hard disks, optical disks, and magnetic tapes.

The memory 206 includes module(s) 208 and data 210. The modules 208 include routines, programs, objects, components, data structures, and the like, which perform particular tasks or implement particular abstract data types. The modules 208 further include modules that supplement applications on the system 110, for example, modules of an operating system. The data 210 serves as a repository for storing data that may be processed, received, or generated by one or more of the modules 208.

In an implementation, the modules 208 of the system 110 include an authentication module 212, an execution module 214, an evaluation module 216, the database scaling module 112, assessment and grading module 218 and other module(s) 228. The other module(s) 228 may include programs or coded instructions that supplement applications and function, for example, programs in the operating system of the user device 102.

In an implementation, data 210 include authentication data 220, evaluation data 222, database scaling data 224, assessment and grading data 226 and other data 230. The other data 230 includes data generated as a result of the execution of one or more modules in the other module(s) 228.

The authentication module 212 is configured to authenticate the participants P taking part in the competition. Individuals who are eligible of competing in the competition may be given login details including a participant ID and a password. The eligibility criteria may be set by the organizing committee of the competition. An individual may be eligible to participate in the competition if he is above a specific age, has a relevant educational background, has prior knowledge of programming, etc. The eligibility criteria may include any other parameter which can assess an individual for the purpose of SQL query writing competition.

In operation, the user device 102 receives the login details from the participant P and the authentication module 212 authenticates the participant P based on the received login details. The authentication module 212 performs such authentication by comparing login details entered by the participant P with login details pre-stored in the authentication data 220. If comparison indicates that the login details provided by the participant P are correct, the participant P is authenticated and allowed to participate in the competition. On the other hand, if the comparison indicates that the login details provided by the participant P are incorrect, the authentication fails and the participant P is not allowed to participate in the competition. It is to be understood that the authentication data 220 is shown within the data 210 for the purpose of clarity. However, such authentication data 220 may also be placed in an external repository associated with the user device 102.

The execution module 214 allows the participants P to execute the SQL queries, written by them during the competition, against the emulated database 108. The participants P, after writing the queries, execute their queries on the emulated database 108 to check the functional correctness of the queries. It is understood that, for the purpose of execution of the query, the participants P are provided with access of the emulated database 108. The accessing of the emulated database 108 may be part of the execution of query, and the execution module 214 may be configured to provide access of the emulated database 108 to the participants P.

In operation, the user device 102 may receive a request from the participant P for execution of the SQL query against the emulated database 108. Upon receiving the request, the execution module 214 accesses the emulated database 108 and executes the query against the emulated database 108. The execution of the query against the emulated database 108 outputs results based on the query. The results include records fetched from the database. If the fetched records are not as desired by the participant P and/or as required by the problem statement given to the participant P, the query may not be functionally correct. In such a case, the participant P may tune or modify his query during the competition to make it functionally correct. In case other discrepancies are observed, the query can be tuned or modified accordingly.

The evaluation module 216 is configured to evaluate performance efficiency of the SQL query. As explained earlier, the performance efficiency is evaluated through parameters, such as the execution time of the query, the CPU cost and/or the I/O cost. The performance efficiency also depends on the quality of the SQL query and the volume of database against which the query is executed.

In operation, the user device 102 may receive a request from the participant P for evaluation of performance of his query against the emulated database 108. Upon receiving such a request, the evaluation module 216 evaluates the performance efficiency determining parameters, such as the execution time of the query, the CPU cost and/or the I/O cost, based on the execution of the query, and stores the parameters in the evaluation data 222 for any further reference. It is to be understood that the evaluation data 222 is shown within the data 210 for the purpose of clarity. However, such evaluation data 222 may also be placed in an external repository associated with the user device 102. Further, in an example, the performance efficiency determining parameters for the query may be conveyed to the organizing committee for their reference.

An SQL query having higher execution time, higher CPU cost and/or higher I/O cost, has lower performance efficiency. Thus, if the participant P finds that the execution time, the CPU cost and/or I/O cost are high for his query, he may tune or modify his query during the competition to improve the performance efficiency of his query. Further, it may be possible that the participant P may tune or modify the emulated database 108, provided to him for execution of the query, to improve the performance efficiency of his query.

The system 110 enables testing of SQL query writing skills to identify a true SQL programming talent. The system 110 allows the participants P to scale the database (database scaling module 112) during the competition and to execute and check the performance efficiency of their queries against databases of different volumes during the competition. Further, the participants can tune the query and optimize performance efficiency of the queries against a high volume database during the writing stage, before submitting their queries to the organizing committee. The description hereinafter describes the scaling of the emulated database 108 by the participants P during the competition, the execution of the query against the scaled emulated database and checking of performance efficiency of the query when executed against the scaled emulated database. For the purpose of description herein, the system 110 is considered to be implemented in the user device 102 which the participant P uses for participating in the competition.

The participants P may decide to first execute the query against the emulated database 108 of a low volume and check the functional correctness and the performance efficiency of the query, and subsequently scale up the emulated database 108 to a high volume, execute and check the performance efficiency of the query against the high volume emulated database. Alternatively, the participants P may decide to scale up the emulated database 108 to a high volume first, and then execute the query against the high volume emulated database to check the functional correctness and the performance efficiency of the query.

For sake of clarity, the emulated database 108 after scaling hereinafter may be referred to as 'scaled emulated database 108', and the emulated database 108 after scaling up to a high volume hereinafter may be referred to as 'high volume emulated database 108'.

For scaling, the user device 102 may receive a request from the participant P to scale the emulated database 108. The participant P requests to scale the volume of the emulated database 108. This allows the participant P to check the performance efficiency of his query against low and high volume databases during the competition. In operation, the database scaling module 112 scales the volume of the emulated database 108 according to the request of scaling received from the participant P.

The participant P may scale to increase the volume of the emulated database 108. The volume may be increased by a scaling percentage defined by the participant P. With this, the scaling percentage gets applied to all the tables of the database. However, as explained earlier, for certain types of tables, the volume may not increase accurately by the scaling percentage. For this, the volume may be increased by increasing the number of rows in selected tables to a number defined by the participant P. The combination of increasing by the scaling percentage and by increasing the number of rows enables accurate scaling up of the database. The database scaling data 224 stores the scaling percentage and the number of rows defined by the participant P for scaling the emulated database 108.

After the scaling, the user device 102 may receive a request from the participant P for execution of the query against the high volume emulated database 108. Upon receiving the request, the execution module 214 accesses the high volume emulated database 108 to execute the query against it. If the output, after the execution, is not as desired by the participant P and/or as required by the problem statement given to the participant P, the query may not be functionally correct. In such a case, the participant P may tune or modify his query during the competition to make it functionally correct.

After checking the functional correctness of the query against the high volume emulated database 108, the user device 102 may receive a request from the participant P for evaluation of performance efficiency of his query against the high volume emulated database 108. The evaluation module 216 evaluates the performance efficiency determining parameters, such as the execution time of the query, the CPU cost and/or the I/O cost, based on the execution of the query upon receiving such a request. These parameters get stored in the evaluation data 222 for any further reference. For example, the performance efficiency determining parameters for the query may be conveyed to the organizers for their reference.

It may be possible that the query having a high performing efficiency against a low volume database may have a low performance efficiency against a high volume database. If the performance is low against the high volume database, the participant P may further tune the query and optimize the performance efficiency. For optimizing the performance efficiency, the participant P may tune the emulated database 108 as well.

In an implementation, the participant P may scale-up the volume of the emulated database 108 to match the size of an evaluation database. The evaluation database may be understood to be a production database having a substantially high volume. For example, the evaluation database may have records in a range from 1 million to 1 billion.

The participants P, after checking the functional correctness and performance efficiency of their queries against low and high volume databases, may finalize the queries and submit them for evaluation. In an implementation, the finalized queries may be submitted to the organizing committee. The organizing committee may set a predefined competition time, within which the participants P can write, tune and finalize their queries for submission. The organizers may receive submissions from all the participants P and evaluate the performance efficiency of all the submitted queries against the evaluation database. For this, the organizers may independently evaluate the queries or they may evaluate the performance efficiency stored in the evaluation data 222 for all the queries. Based on the evaluation, the query with the best performance efficiency against low and high volume databases is adjudicated as the best query and the participant P who submitted the best query is declared as the winner of the competition. In an implementation, the procedure to evaluate the queries and adjudicate the winner is automated.

In an implementation, the participants' P performance may be assessed and graded based on the final queries submitted by them. The participants P may be assessed and graded for their problem comprehension skills, problem solving and query writing skills and problem solving speed. Also, as mentioned above, the participants P may also be assessed and graded against the performance efficiency of the submitted queries, which may include resource utilization by the queries and speed of execution of the queries. With such an assessment and grading methodology, a 360 degree assessment of programming skills of the participants P may be achieved and thus, an SQL query programmer with a substantially high level of SQL query writing skills may be easily and efficiently identified from a large number of participants P.

In an implementation, for the purpose of assessing and grading the problem comprehension and problem solving skills of the participants P, the queries submitted by the participants P and/or the solution obtained through the submitted queries may be compared with a pre-solved functionally correct solution. The pre-solve solution may be the solution as desired by the organizers of competition. In an implementation, the pre-solved favourable solution may be stored in the server 104.

Further, in an implementation, for the purpose of assessing and grading the problem comprehension and problem solving skills of the participants P, the queries submitted by the participants P may be checked for plagiarism. This checking for plagiarism may enable the organizers to find whether any participant P has submitted a query that has already been submitted by another participant P. For check the plagiarism, conventionally known plagiarism detection techniques may be implemented. For example, the queries of any two participants P may be compared to find any similar strings in the query. With this, participants P with true SQL query writing skills may be found.

In an implementation, based on the assessment and grading done for each of the participants P, a report may be generated and received by the user device 102. In operation, the assessment and grading module 218 receives the report, and the report is stored in the assessment and grading data 226. In an implementation, the report lists grades, score or performance level against various parameters, such as problem comprehension skills, problem solving skills, problem solving speed, resource utilization by the query, speed of execution of the query and a parameter for plagiarism checking of the submitted query with respect to at least one other submitted query.

In one implementation, the user device 102 may be configured to assess and grade the performance of the participants P. In said implementation, the user device 102 generates the report on assessment and grading with various parameters, as mentioned above, for evaluating the performance of the participants P.

Figure 3:
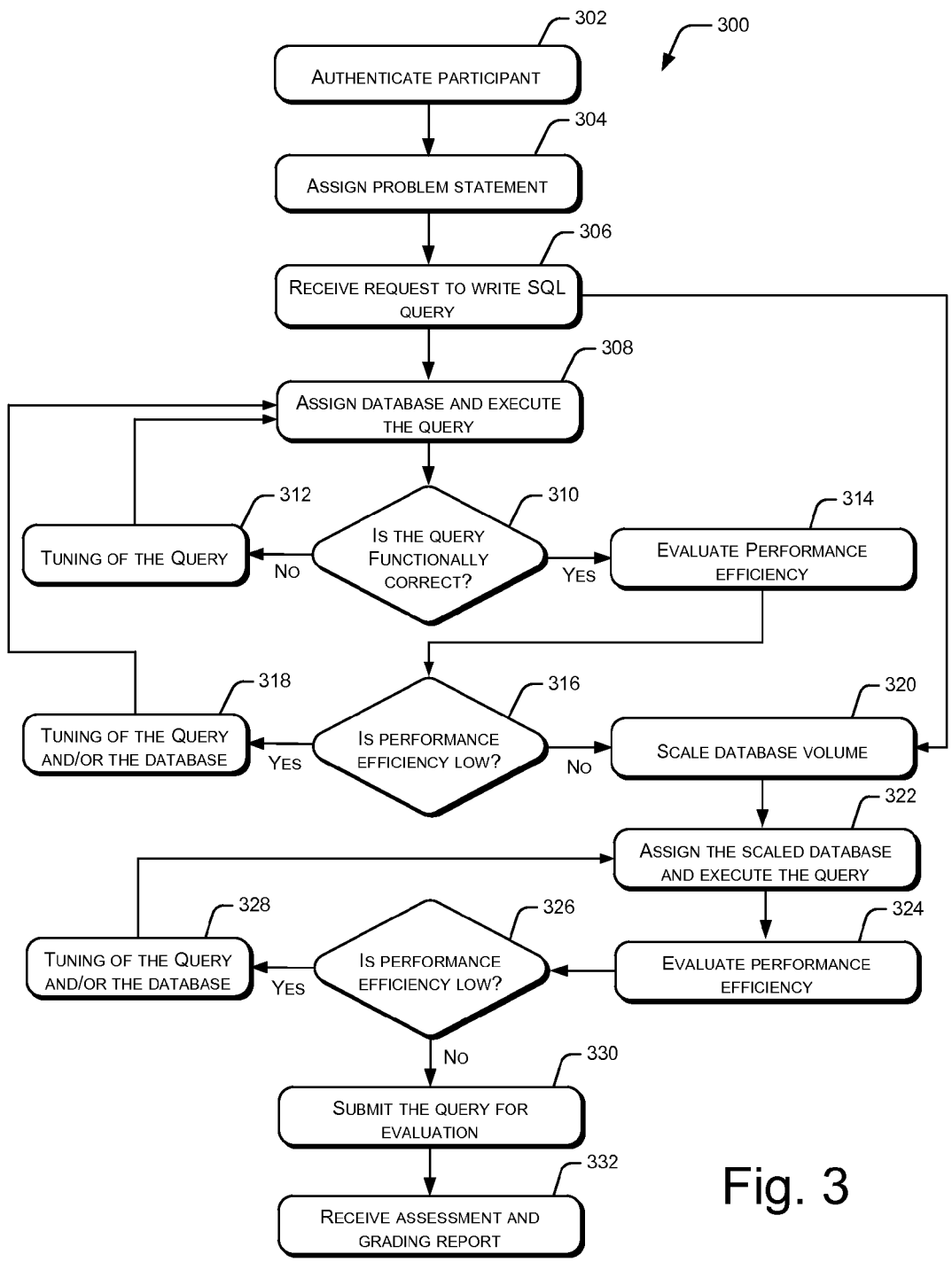
FIG. 3 illustrates a method for testing SQL query writing skills in a competition, according to an implementation of the present subject matter.

FIG. 3 illustrates a method 300 for testing SQL query writing skills in a competition, according to an implementation of the present subject matter. The method 300 may be described in the general context of computer executable instructions. Generally, computer executable instructions can include routines, programs, objects, components, data structures, procedures, modules, and functions that perform particular functions or implement particular abstract data types. The method 300 may also be practiced in a distributed computing environment where functions are performed by remote processing devices that are linked through a communications network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method, or an alternative method. Additionally, individual blocks may be deleted from the method without departing from the spirit and scope of the subject matter described herein. Furthermore, the method 300 can be implemented in any suitable hardware, software, firmware, or combination thereof.

At block 302, the participant P participating in the competition gets authenticated. The participant P logins to the user device 102 through which he will participate in the competition. For this, the participant P may enter the login details, such as the participation ID and the password, assigned to him. The authentication module 212 authenticates the login details. After logging in the user device 102, the participant P is assigned with a problem statement, at block 304, for which he has to write an SQL query. In an implementation, the organizing committee may provide the problem statement separately, and the participant P may log in the user device 102 to write an SQL query for the problem statement.

After assigning the problem statement, a request for writing an SQL program or SQL query by the participant P is received, at block 306. The participant P writes the query based on the problem statement assigned to him. The participant P may then execute the query against the emulated database 108 to check the functional correctness of the query, at block 308. For this, the execution module 214 provides the access of the emulated database 108 to the user device 102 and executes the query thereon based on the request from the participant P. It is to be understood that the emulated database 108 at this stage (by-default) is an un-scaled or a low volume database. The execution of the query outputs results in the form of records fetched from the emulated database 108. Then, at block 310, the functional correctness of the query is checked. The functional correctness of the query depends on the output. If the output is not as desired, i.e. the query is not functionally correct ('No' branch from block 310), the participant P may tune his query during the competition to make it functionally correct, at block 312. Subsequently, the participant P may execute his query again against the emulated database 108.

If the query is functionally correct ('Yes' branch from block 310), the participant P may evaluate the performance efficiency of the query, at block 314. For this, the evaluation module 216 evaluates at least one performance parameter from the execution time, the CPU cost and the I/O cost for the query when executed on the emulated database 108 based on the request from the participant P. Based on the mention parameters, the participant P may check the performance efficiency of his query, at block 316. If the performance efficiency is low ('Yes' branch from block 316), the participant P may tune the query and/or tune the emulated database 108 to improve the performance efficiency, at block 318, and subsequently may execute the query again against the emulated database 108. In an implementation, the execution of the query and the performance evaluation may take place at the same time.

If the performance efficiency of the query is not low ('No' branch from block 316), the participant P may scale the volume of the emulated database 108, at block 320, to check the performance efficiency of his query against a larger database during the competition. The participant P may scale the emulated database 108 by increasing the volume of the database by a scaling percentage and/or by increasing the number of rows in selected tables to a number defined by the participant P. In operation, the database scaling module 112 scales the emulated database 108 according to the request of scaling received from the participant P. For example, the emulated database 108 becomes a high volume database. In an implementation, the participant P may request to scale the database immediately after writing the query (branch from block 306 to block 320).

After scaling the emulated database 108, the participant P may execute his query against the scaled high volume database, at block 322, and may evaluate the performance efficiency of the query when executed against the scaled high volume database, at block 324. For this, the execution module 214 executes the query and the evaluation module 216 evaluates the performance efficiency of the query based on the execution request and the evaluation request, respectively, received from the participant P. The participant P then may check the performance efficiency of the query against the high volume database, at block 326. If the performance efficiency is low against the high volume database ('Yes' branch from block 326), the participant P may tune the query and optimize the performance efficiency of the query, at block 328. For optimizing the performance efficiency, the participant P may tune the database as well, at block 328. Subsequently, the participant P may execute the query again against the high volume database.

If the performance efficiency of the query is not low against the high volume database ('No' branch from block 326), the participant P may finalize his query and submit the finalized query for evaluation, at block 330.

After the submission done by the participant, the submitted query and its performance efficiency are evaluated against an evaluation database to determine the best query. Further, the performance of the participant P is assessed and graded against various parameters as mentioned earlier. Based on the assessment and grading, an assessment and grading report having the details of performance of the participant P is received, at block 332. In an implementation, the participant P with high levels of skills who has submitted the query with best performance efficiency is declared as the winner, and subsequently rewarded suitably.

The implementation described herein relates to the system and method for testing SQL query writing skills in a competition. However, a similar description may extend to other similar programming competitions.

The present subject matter provides for an advantageous way to identify an SQL programmer through an SQL query writing competition. The concept of testing SQL query writing skills of the present subject matter is efficient, requires less hardware, tests query and performance tuning skills of programmers, and, thus, is advantageous over conventionally known ways to test SQL query writing skills in competitions.

Although embodiments for testing SQL query writing skills in competitions have been described in language specific to structural features and/or methods, it is to be understood that the invention is not necessarily limited to the specific features or methods described. Rather, the specific features and methods are disclosed and explained in the context of a few embodiments for testing SQL query writing skills in competitions.

We claim:

1. A method for testing SQL query writing skills, the method comprising:
receiving a request from a participant (P) to write an SQL query;
providing an access for the participant (P) to an emulated database for the participant (P) to request execution of the SQL query against the emulated database;
scaling volume of the emulated database based on inputs received from the participant (P), wherein the scaling comprises increasing the volume of the emulated database by a percentage based on the inputs;
executing the SQL query against the emulated database, scaled based on the inputs of the participant (P), to evaluate performance efficiency of the SQL query; and
submitting the SQL query of the participant (P) for evaluation.

2. The method as claimed in claim 1, wherein the providing the access of the emulated databases is through a shared pool of configurable computing resources.

3. The method as claimed in claim 1, wherein the scaling comprises:
increasing number of rows of tables in the emulated database to a number based on the inputs received from the participant (P).

4. The method as claimed in claim 1, wherein the method further comprises:
evaluating performance efficiency of the SQL query, submitted by the participant (P), against an evaluation database.

5. The method as claimed in claim 1, wherein the method further comprises:
receiving an assessment and grading report for the SQL query, wherein the assessment and grading report comprises at least one of problem comprehension skills of the participant (P), problem solving skills of the participant (P), problem solving speed of the participant (P), resource utilization by the SQL query, and speed of execution of the SQL query.

6. The method as claimed in claim 5, wherein the assessment and grading report comprises a parameter for plagiarism checking of the SQL query with respect to at least one other submitted SQL query.

7. A system comprising:
a processor; and
a memory coupled to the processor, wherein the memory comprises:
an authentication module configured to authenticate a participant (P) for writing an SQL query;
an execution module configured to:
provide access to the participant (P) to an emulated database through a shared pool of configurable computing resources; and
execute the SQL query of the participant (P) against the emulated database;
a database scaling module configured to scale volume of the emulated database by increasing volume of the emulated database by a percentage based on inputs received from the participant (P) to tune performance of the SQL query; and
an evaluation module configured to evaluate performance efficiency of the SQL query against the emulated database, scaled based on the inputs of the participant (P).

8. The system as claimed in claim 7, wherein the database scaling module is configured to increase number of rows of tables in the emulated database to a number based on inputs received from the participant (P).

9. The system as claimed in claim 7, wherein the system is configured to submit the SQL query of the participant (P) for evaluation.

10. The system as claimed in claim 7, wherein the system further comprises an assessment and grading module configured to receiving an assessment and grading report for the SQL query, wherein the assessment and grading report comprises at least one of problem comprehension skills of the participant (P), problem solving skills of the participant (P), problem solving speed of the participant (P), resource utilization by the SQL query, and speed of execution of the SQL query.

11. The system as claimed in claim 10, wherein the assessment and grading report comprises a parameter for plagiarism checking of the SQL query with respect to at least one other submitted SQL query.

12. A non-transitory computer-readable medium having computer-executable instructions that when executed perform acts comprising:
receiving a request from a participant (P) to write an SQL query;
providing an access for the participant (P) to an emulated database through a shared pool of configurable computing resources to receive a request from the participant (P) to execute the SQL query against the emulated database;
scaling volume of the emulated database by increasing volume of the emulated database by a percentage based on inputs received from the participant (P) to tune performance of the SQL query;
executing the SQL query against the emulated database, scaled based on the inputs of the participant (P), to evaluate performance efficiency of the SQL query; and
submitting the SQL query of the participant (P) for evaluation.

13. The non-transitory computer-readable medium as claimed in claim 12, wherein the acts further comprise:
receiving an assessment and grading report for the SQL query, wherein the assessment and grading report comprises at least one of problem comprehension skills of the participant (P), problem solving skills of the participant (P), problem solving speed of the participant (P), resource utilization by the SQL query, speed of execution of the SQL query, and a parameter for plagiarism checking of the SQL query with respect to at least one other submitted SQL query.

* * * * *